United States Patent [19]

MacLean et al.

[11] 4,269,248

[45] May 26, 1981

[54] FASTENER WITH FLEXIBLE FLANGE

[75] Inventors: Barry L. MacLean, Libertyville; William L. Grube, Lake Bluff, both of Ill.

[73] Assignee: MacLean-Fogg Company, Mundelein, Ill.

[21] Appl. No.: 31,760

[22] Filed: Apr. 20, 1979

[51] Int. Cl.³ .............................................. F16B 39/28
[52] U.S. Cl. ..................... 411/186; 411/402; 411/427
[58] Field of Search ............... 151/38, 37, 35, 33; 85/50 R, 62, 32 R, 9 R, 32 V

[56] References Cited

U.S. PATENT DOCUMENTS

| | | | |
|---|---|---|---|
| 367,196 | 7/1887 | Deblieux | 151/37 |
| 551,043 | 12/1895 | Otto | 151/38 |
| 1,229,911 | 6/1917 | Dodds | 151/38 |
| 1,581,559 | 4/1926 | Williams | 151/38 |
| 1,635,082 | 7/1927 | Hultgren et al. | 151/38 |
| 1,923,647 | 8/1933 | Vera | 151/37 |
| 2,253,241 | 8/1941 | MacDonald | 151/37 |
| 2,959,204 | 11/1960 | Rigot | 151/37 |
| 3,056,443 | 10/1962 | Knocke | 151/38 |
| 3,078,899 | 2/1963 | MacLean et al. | 151/37 |
| 3,137,196 | 6/1964 | Stawinski | 85/32 V |
| 3,164,055 | 1/1965 | Duffy | 151/38 X |
| 3,277,942 | 10/1966 | Dwyer | 151/21 B |
| 3,543,826 | 12/1970 | Fergaard | 151/21 B |
| 3,877,339 | 4/1975 | Muenchinger | 151/35 X |
| 4,094,352 | 6/1978 | Hlinsky | 151/37 |

FOREIGN PATENT DOCUMENTS

| | | | |
|---|---|---|---|
| 397340 | 2/1966 | Switzerland | 151/38 |
| 276786 | 9/1927 | United Kingdom | 151/38 |

*Primary Examiner*—Ramon S. Britts
*Attorney, Agent, or Firm*—Mason, Kolehmainen, Rathburn & Wyss

[57] ABSTRACT

A fastener such as a threaded nut, bolt or screw includes a body portion with a bearing surface at the workpiece engaging end defined at least in part by a flange. Segments of the bearing surface defined by the flange are flexible and resilient so that upon tightening of the fastener against a workpiece or other element, deflection of the resilient segments provides a spring action to compensate for developed looseness or loss of tension. Other segments of the bearing surface adjacent the flexible segments are rendered rigid by the body portion of the fastener and by brace structure associated with the body portion to the end that substantial spring forces are achieved.

9 Claims, 6 Drawing Figures

U.S. Patent
May 26, 1981
4,269,248
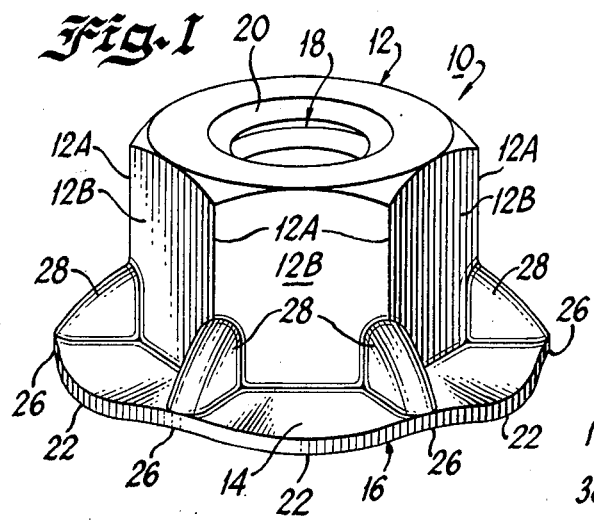
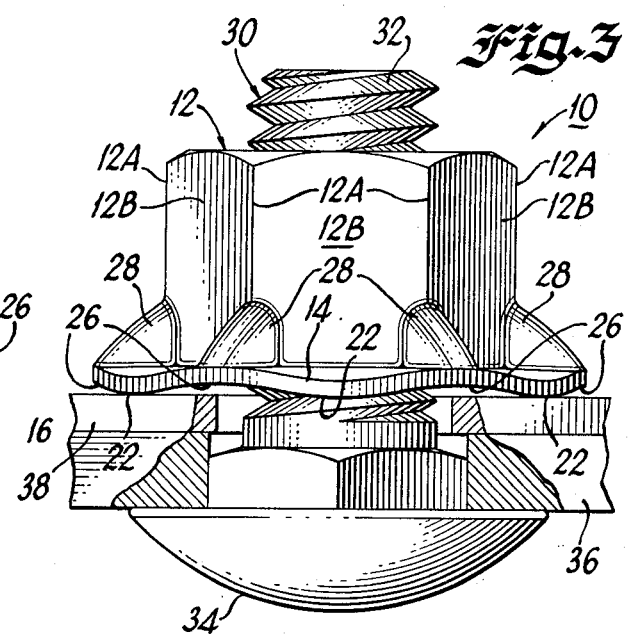
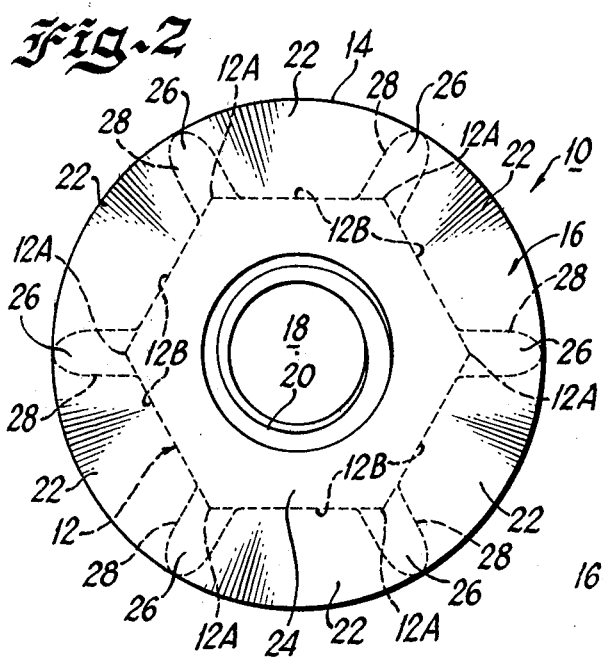
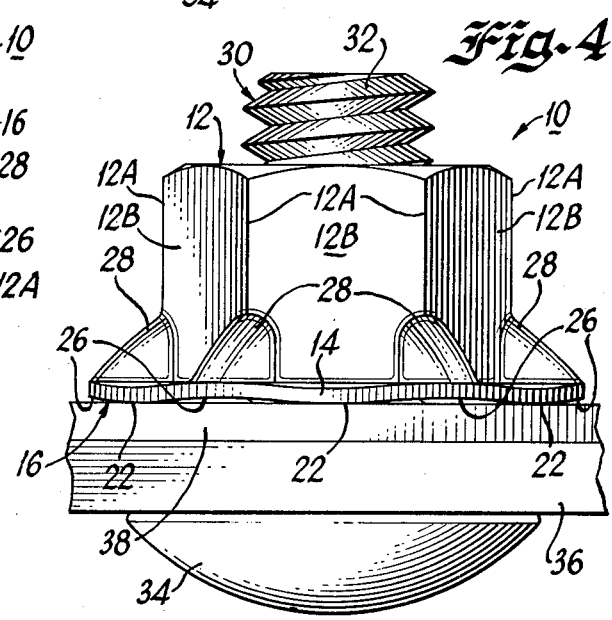
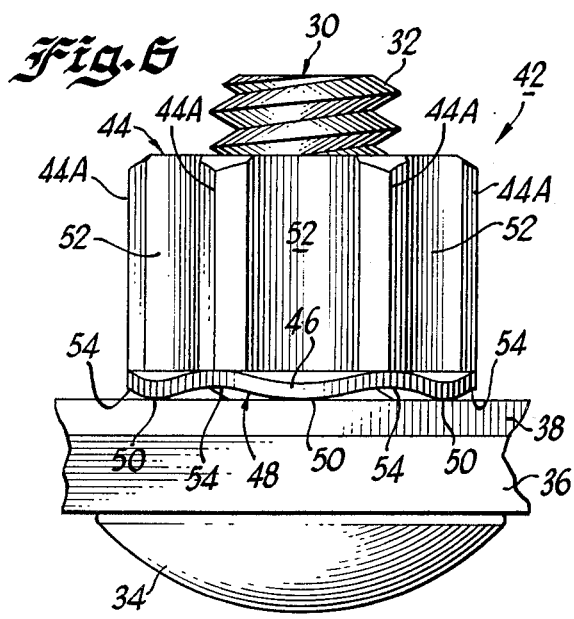
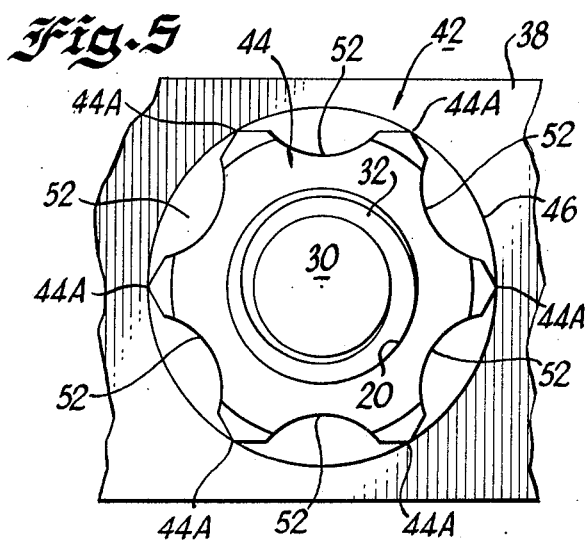

FASTENER WITH FLEXIBLE FLANGE

The present invention relates to an improved fastener having spring characteristics for maintaining tension in a threaded joint.

In some respects the disclosure of the present application is similar to the disclosure of a U.S. patent application entitled LOCKING FASTENER WITH RESILIENT AND RIGID FLANGE SEGMENTS, Ser. No. 31,769, filed on the same day as the present application.

The desirability of providing resilience in a threaded joint is widely recognized. In the absence of sufficient flexibility, looseness can develop in the joint due to such factors as smoothing out or wearing of parts, thermal expansion, compression set of gaskets or other material, or the like. In order to compensate for developed looseness and to maintain clamp load or bolt tension in the joint, in the past it has been common practice to use washers having spring characteristics such as cone or bellville washers, or helical spring washers.

For various reasons including the inconvenience, expense, and possibility of misassembly associated with the use of discrete washers, it has been proposed to provide fasteners having permanently associated therewith a washer or having an integral structure providing spring characteristics. For example, nuts and screws having integral flexible portions are shown in U.S. Pat. Nos. 1,229,911; 1,635,082; 3,056,443 and 3,877,339.

The present invention relates to improvements in the type of fasteners having integral structure for introducing flexibility or elasticity into a threaded joint. Among the important objects of the present invention are to provide a fastener having improved structure for providing a spring or flexible and resilient characteristic upon tighening of the fastener thereby to maintain tension in a threaded joint; to provide a fastener wherein flexibility is achieved without the sacrifice of the ability to apply substantial clamp loads and to provide a fastener wherein substantial spring forces are achieved.

In brief, the objects and advantages of the present invention are realized through the provision of a threaded fastener for use in a threaded joint and including a body portion having a wrenching structure and having a workpiece engaging end. A generally circular flange at the workpiece engaging end of the fastener includes a plurality of resilient and flexible flange segments. Each flexible and resilient flange segment is bowed and extends both radially and outward from the workpiece engaging end of the body portion. Reinforcing means interspersed between the resilient and flexible flange segments cooperates with the body portion to render the radially inner boundary and the lateral boundaries of the flexible and resilient flange segments substantially rigid.

The present invention may be best understood by reference to the embodiments of the invention illustrated in the accompanying drawing wherein:

FIG. 1 is a perspective view of a fastener embodying the present invention;

FIG. 2 is a bottom plan view of the fastener of FIG. 1;

FIG. 3 is a side view of a threaded joint including the locking fastener, shown partly in cross section, and showing the locking fastener in a snug-tight or finger-tight condition prior to tightening;

FIG. 4 is a side view of the threaded joint with the fastener in a tightened condition;

FIG. 5 is a top view of a threaded joint including a fastener comprising an alternative embodiment of the present invention; and FIG. 6 is a side view of the threaded joint of FIG. 5 showing the fastener of FIG. 5 in a snug-tight or finger-tight condition prior to tightening.

Having reference now to the drawing and initially to FIGS. 1-4 there is illustrated a one-piece, metal fastener generally designated by the reference numeral 10 and constructed in accordance with the principle of the present invention. The fastener 10 is illustrated as a nut, although it should be understood that the principles of the present invention are applicable as well to headed fasteners such as bolts and screws.

In general, the nut 10 is in the form of a hex flanges nut having an hexagonal body portion 12 with corners 12A and flats 12B adapted to be engaged by a wrench for tightening of a threaded joint including the nut 10. One end of the nut is provided with a flange structure 14 and includes an axially directed bearing surface 16. A central axial opening 18 extends through the nut and is provided with a female thread structure 20 for mating with complementary threads on a cooperating fastener.

In accordance with the present invention, the fastener 10 includes structure providing a spring characteristic to compensate for developed looseness or loss of tension in a threaded joint thereby to maintain clamp load and bolt tension despite developed looseness due to thermal expansion and contraction, gasket set or the like. Moreover, substantial spring forces are achieved with a compact and inexpensively manufactured structure.

More specifically, and as best seen in FIG. 2, the bearing surface 16 defined at the workpiece engaging end of the fastener 10 includes a plurality of flexible and resilient portions or segments 22. Flexibility of the segments 22 is effected by forming the flange structure 14 of the fastener 10 with a relatively thin cross-section as compared with the thicker flange cross-section of a standard hex flange nut wherein the flange is functionally rigid in use. As a result of the use of a relatively thin flange, the flexible and resilient bearing surface regions 22 are able resiliently to deflect in the axial direction under the loading experienced in a threaded joint.

In addition to the flexible segments 22, the bearing surface 16 includes a central region 24 surrounding the threaded opening 18 and lying radially inward of the flexible segments 22. The central region 24 is effectively rigid due to the fact that it coincides with the hex body portion 12 of the fastener 10 as indicated in broken lines in FIG. 2.

Interspersed between the flexible segments 22 of the bearing surface 16 are a number of spoke-like relatively rigid regions 26. In order to render the regions 26 functionally rigid, the fastener is provided with supporting or reinforcing structure associated with the body portion 12 and aligned with the regions 26. In the embodiment illustrated in FIGS. 1-4, the fastener 10 is provided with a number of brace or support structures 28 in the form of gussets or strut-like braces extending radially outward and sloping axially from the body portion 12 of the fastener 10 to the flange structure 14. The gussets 28 serve to brace or reinforce the regions 26 so that they are unable to axially deflect to a significant degree when subjected to clamp loads in a threaded joint.

In the illustrated arrangement, there are provided six gussets 34 aligned with six rigid bearing surface regions 26, these being aligned with the corners 12A of the hexagonal body portion 12. This configuration has the result that the flexible segments extend from the flats 12B and radial length of the flange 14 at the flexible segments 22 is maximized.

In order to permit the flexible segments 22 of the bearing surface 16 and the associated portions of the flange 14 to function collectively as a spring to maintain tension in a threaded joint, the flange 14 in the region of the flexible segments 22 is bowed axially in the workpiece engaging direction. While the rigid central region 24 and spoke-like regions 26 all lie in a common plane normal to the axis of the fastener 10, the flexible segments 22 are axially displaced as by forming the periphery of the flange 14 in a wavy or undulating configuration.

Having reference now to FIGS. 3 and 4, there is illustrated a threaded joint generally designated 30 including the fastener 10 of the present invention. In addition to the fastener 10, the joint 30 includes a cooperating fastener in the form of a bolt 32 having a head 34 non-rotatably engaged with a structural member 36 to which another member or workpiece 38 is joined.

In FIG. 3 the joint 30 is illustrated in a snug-tight or finger-tight condition prior to final tightening of the fastener 10. In this condition, the flexible segments 22 of the bearing surface 16 contact the workpiece 38 while the rigid bearing surface regions 24 and 26 are axially spaced from the workpiece by an appreciable distance.

In FIG. 4 the threaded joint 30 is illustrated in a tightened condition. As the fastener 10 is tightened against the workpiece 38, the rigid bearing surface regions 24 and 26 approach the workpiece 38 and the flexible segments 22 resiliently deform in the manner of a spring to apply substantial clamp loads in the threaded joint. As a result, tension is maintained in the joint despite factors such as wearing of parts, vibrations, thermal contraction, compression set or the like.

The fastener 10 is capable of imposing large spring forces despite its compact size and readily manufactured configuration. Each flexible segment 22 is bounded at its radially inward edge by the relatively rigid central region 24 aligned with the body 12 of the fastener. Each flexible segment 22 is also bounded at its sides by the rigid spoke-like regions 26. Because each flexible segment 22 is partially surrounded by rigid portions of the bearing surface, each segment 22 forms a relatively heavy or strong spring.

Having reference now to FIGS. 5 and 6, there is illustrated a threaded joint 40 similar to the joint 30 of FIGS. 3 and 4 except that it includes a unitary, metal fastener generally designated as 42 and comprising an alternative embodiment of the present invention. The same reference numerals are used for those components of the joint 40 which are similar to the components described above with reference to FIGS. 3 and 4. While the fastener 42 is illustrated as a nut, it should be understood that the principles of the present invention are applicable as well to headed fasteners such as bolts and screws.

In general, the nut 42 is in the form of a hex nut having a partially hexagonal body portion 44 with corners 44A defined by partial flats adapted to be engaged by a wrench for tightening of a threaded joint including the nut 42. One end of the nut is provided with a flange structure 46 having a generally circular periphery coinciding with corners 44A. The flanged end of the fastener 42 includes an axially directed bearing surface 48.

In accordance with the present invention, the fastener 42 includes structure providing a spring characteristic to compensate for developed looseness or loss of tension in a threaded joint thereby to maintain clamp load and bolt tension despite developed looseness due to thermal expansion and contraction, gasket set or the like. Moreover, substantial spring forces are achieved with a compact and inexpensively manufactured structure.

More specifically, the bearing surface 48 includes a plurality of flexible and resilient portions or segments 50. Segments 50 are located between the corners 44A around the periphery of the flange 46. Flexibility of the segments 50 is effected by forming the flange structure 46 of the fastener 42 with a relatively thin cross-section able resiliently to deflect in the axial direction under the loading experienced in a threaded joint.

The ability of the segments 50 to flex is enhanced by means of recesses 52 formed in the flats of the body portion 44 in order to increase the area of the flange 46 and of the segments 50. Use of the recesses 52 may be desirable if the diameter of the flange is not appreciably larger than the corner-to-corner dimension of the body portion. Because the recesses 52 leave portions of the flats adjacent the corners 44A undisturbed, the fastener 42 is able to be tightened with a conventional wrench.

In addition to the flexible segments 50, the bearing surface 48 includes a central region surrounding the threaded opening 18 and lying radially inward of the flexible segments 50. The central region is effectively rigid due to the fact that it coincides with the body portion 44 of the fastener 42. The rigid central region, which is not seen in FIGS. 5 and 6, is similar to but relatively somewhat smaller than the region 24 shown in FIG. 2.

Interspersed between the flexible segments 50 of the bearing surface 48 are a number of spoke-like relatively rigid regions 54. The regions 54 are functionally rigid because they are aligned with the corners 44A of the body portion 44. In the embodiment illustrated in FIGS. 5 and 6, the corners 44A thus serve as brace or support structures serving to brace or reinforce the regions 54 so that they are unable to axially deflect to a significant degree when subjected to clamp loads in a threaded joint.

In order to permit the flexible segments 50 of the bearing surface 48 and the associated portions of the flange 46 to function collectively as a spring to maintain tension in a threaded joint, the flange 46 in the region of the flexible segments 50 is bowed axially in the workpiece engaging direction. While the rigid central region and the spoke-like regions 54 all lie in a common plane normal to the axis of the fastener 42, the flexible segments 50 are axially displaced as by forming the periphery of the flange 46 in a wavy or undulating configuration.

In FIG. 6 the joint 40 is illustrated in a snug-tight or finger-tight condition prior to final tightening of the fastener 42. In this condition, the flexible segments 50 of the bearing surface 48 contact the workpiece 38 while the rigid bearing surface regions including the spoke-line regions 54 are axially spaced from the workpiece by an appreciable distance.

When the fastener 10 is tightened against the workpiece 38, the rigid bearing surface regions approach the workpiece 38 and the flexible segments 50 resiliently deform in the manner of a spring to apply substantial clamp loads in the threaded joint. As a result, tension is maintained in the joint despite factors such as wearing of parts, vibrations thermal contraction, compression set or the like.

The fastener 42 is capable of imposing large spring forces despite its compact size and readily manufactured configuration. Each flexible segment 50 is bounded at its radially inward edge by the relatively rigid central region aligned with the body 12 of the fastener. Each flexible segment 50 is also bounded at its sides by the rigid spoke-like regions 54. Because each flexible segment 50 is partially surrounded by rigid portions of the bearing surface, each segment 50 forms a relatively heavy or strong spring.

While the invention has been described with reference to details of the illustrated embodiments, such details are not intended to limit the scope of the invention as defined in the appended claims.

What is claimed and desired to be secured by Letters Patent of the United States is:

1. A threaded fastener for use in a threaded joint and comprising a solid body portion including a wrenching structure and having a workpiece engaging end, a thread structure including a plurality of thread convolutions, flange means at the workpiece engaging end of the body portion, said flange means including a plurality of resilient and flexible flange segments extending both radially and axially outward from the workpiece engaging end of said body portion, said flange being connected throughout its inner periphery to said body portion, and reinforcing means interspersed between said flange segments and cooperating with said body portion to render the radially inner boundary and the lateral boundaries of said flange segments substantially rigid.

2. The threaded fastener of claim 1 wherein said body portion is generally hex-shaped and wherein said reinforcing means is aligned with the corners of said body portion and said resilient and flexible flange segments are aligned with the flats of said body portion.

3. The threaded fastener of claim 2 wherein said flange means is generally circular and wherein the periphery of said flange means is radially spaced outwardly from said corners.

4. The threaded fastener of claim 3, said reinforcing means comprising brace structure extending between said body portion and said flange.

5. The threaded fastener of claim 4, said brade structure comprising a gusset extending radially outwardly and sloping axially between said body portion and said flange.

6. The threaded fastener of claim 2 wherein said flange means is generally circular and wherein the periphery of said flange means generally coincides with said corners.

7. The threaded fastener of claim 6 further comprising recesses in said flats overlying said flexible flange segments, said corners and the nonrecessed portions of said flats constituting said reinforcing means.

8. A one-piece, unitary, homogeneous, metal threaded fastener for use in a threaded joint and comprising a solid body portion, a thread structure having a plurality of thread convolutions and surrounding and generally coaxial with the central longitudinal axis of the fastener, a bearing surface defined at one end of said boty portion and adapted to engage a workpiece in the threaded joint, said bearing surface being generally circular and extending radially outward beyond said thread structure, said solid body portion extending axially from said bearing surface and overlying a central region of said bearing surface, said solid body portion having an axial length sufficient to render said bearing surface central region substantially rigid, a plurality of extensions extending radially outward from said body portion substantially to the periphery of said bearing surface, said extensions being spaced apart from one another around the circumference of said bearing surface and overlying said bearing surface for rendering relatively rigid a plurality of spoke-like regions of said bearing surface, said spoke-like regions extending from said central region substantially to the periphery of said bearing surface, the central region and said spoke-like regions lying in a common plane normal to said central longitudinal axis, flexible and resilient flange means extending radially outward from said body portion in the interstices between said extensions to the periphery of said bearing surface and defining spring regions of said bearing surface, each said spring region being bounded at its radially inner extent by said central region of said bearing surface, at its sides by an adjacent pair of said spoke-like regions, and at its radially outer extent by the periphery of said bearing surface, and said flange means being bowed in the axial direction away from said body portion, and said spring portions being engageable with the workpiece while said central and spoke-like regions are spaced from the workpiece.

9. A one-piece, unitary, homogeneous, metal threaded fastener for use in a threaded joint and comprising a solid body portion, a thread structure having a plurality of thread convolutions and surrounding and generally coaxial with the central longitudinal axis of the fastener, a bearing surface defined at one end of said body portion and adapted to engage a workpiece in the threaded joint, said bearing surface being generally circular and extending radially outward beyond said thread structure, said solid body portion extending axially from said bearing surface and overlying a central region of said bearing surface, said solid body portion having an axial length sufficient to render said bearing surface central region substantially rigid, a plurality of extensions of said body portion extending axially outward substantially to the periphery of said bearing surface, said extensions being spaced apart from one another around the circumference of said bearing surface and overlying said bearing surface for rendering relatively rigid a plurality of spoke-like regions of said bearing surface, said spoke-like regions extending from said central region substantially to the periphery of said bearing surface, the central region and said spoke-like regions lying in a common plane normal to said central longitudinal axis, flexible and resilient flange means extending radially outward from said body portion in the interstices between said extensions to the periphery of said bearing surface and defining spring regions of said bearing surface, each said spring region being bounded at its radially inner extent by said central region of said bearing surface, at its sides by an adjacent pair of said spoke-like regions, and at its radially outer extent by the periphery of said bearing surface, and said flange means being bowed in the axial direction away from said body portion, and said spring portions being engageable with the workpiece while said central and spoke-like regions are spaced from the workpiece.

* * * * *